US 10,786,128 B2

(12) United States Patent
Han et al.

(10) Patent No.: US 10,786,128 B2
(45) Date of Patent: Sep. 29, 2020

(54) VACUUM CLEANER, BATTERY ASSEMBLY AND CHARGING STAND

(71) Applicant: LG ELECTRONICS INC., Seoul (KR)

(72) Inventors: Seonghoon Han, Seoul (KR); Jungwan Ryu, Seoul (KR); Seongwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 883 days.

(21) Appl. No.: 15/040,036

(22) Filed: Feb. 10, 2016

(65) Prior Publication Data

US 2016/0235267 A1    Aug. 18, 2016

(30) Foreign Application Priority Data

Feb. 13, 2015  (KR) .................. 10-2015-0022168

(51) Int. Cl.
*A47L 9/28* (2006.01)
*H01M 2/10* (2006.01)
(Continued)

(52) U.S. Cl.
CPC .............. *A47L 9/28* (2013.01); *A47L 9/2884* (2013.01); *H01M 2/1055* (2013.01);
(Continued)

(58) Field of Classification Search
CPC ...... A47L 9/28; A47L 2/1055; H01M 10/613; H01M 10/6557; H01M 10/6562;
(Continued)

(56) References Cited

U.S. PATENT DOCUMENTS 5,879,833 A * 3/1999 Yoshii ................ H01M 2/1088
429/148
2010/0141208 A1* 6/2010 Deal ..................... H01M 2/204
320/116

(Continued)

FOREIGN PATENT DOCUMENTS

DE    103 52 046      6/2005
EP    0 813 265       12/1997
(Continued)

OTHER PUBLICATIONS

English machine translation of Murata (JP 2006107774 A) (Year: 2006).*

(Continued)

*Primary Examiner* — Stewart A Fraser
(74) *Attorney, Agent, or Firm* — Ked & Associates LLP

(57) ABSTRACT

A vacuum cleaner, a battery assembly and a charging stand are provided. The battery assembly may include a plurality of battery cells, and a battery cover configured to support the plurality of battery cells. The battery cover may include a plurality of partition walls, and each of the plurality of partition walls forms a plurality of cell chambers that accommodate each of the plurality of battery cells, respectively, and at least a portion of the plurality of partition walls are spaced apart from each other to form at least one separation chamber.

14 Claims, 13 Drawing Sheets

(51) Int. Cl.
  *H01M 10/6557* (2014.01)
  *H01M 10/613* (2014.01)
  *H01M 10/6562* (2014.01)
  *H01M 10/42* (2006.01)
  *H02J 7/00* (2006.01)
  *H01M 10/643* (2014.01)
  *H01M 10/62* (2014.01)

(52) U.S. Cl.
  CPC ....... *H01M 10/425* (2013.01); *H01M 10/613* (2015.04); *H01M 10/6557* (2015.04); *H01M 10/6562* (2015.04); *H02J 7/0013* (2013.01); *H02J 7/0045* (2013.01); *H01M 10/4257* (2013.01); *H01M 10/62* (2015.04); *H01M 10/643* (2015.04); *H01M 2010/4271* (2013.01); *H01M 2220/30* (2013.01)

(58) Field of Classification Search
  CPC .. H01M 9/2884; H01M 10/425; H01M 10/62; H01M 10/643; H01M 10/4257; H01M 2010/4271; H01M 2220/30; H01J 7/0013; H01J 7/0045
  See application file for complete search history.

(56) References Cited

U.S. PATENT DOCUMENTS

| | | | | |
|---|---|---|---|---|
| 2011/0177373 A1* | 7/2011 | Pellenc | ................ | H01M 2/105 429/120 |
| 2011/0293986 A1* | 12/2011 | Kozu | ................... | H01M 2/105 429/120 |
| 2013/0288096 A1 | 10/2013 | Frutschy et al. | | |
| 2015/0064514 A1* | 3/2015 | Wu | ................... | H01M 10/658 429/56 |
| 2015/0243946 A1* | 8/2015 | Ahn | ................. | H01M 2/10 429/185 |

FOREIGN PATENT DOCUMENTS

| | | |
|---|---|---|
| EP | 1 498 999 | 1/2005 |
| EP | 2 398 108 | 12/2011 |
| JP | 2006107774 A * | 4/2006 |
| JP | 2007-273181 | 10/2007 |
| JP | 2011-175896 | 9/2011 |
| JP | 2012-252959 | 12/2012 |
| KR | 20-0291206 | 10/2002 |
| KR | 10-2006-0118796 | 11/2006 |
| KR | 10-0987413 | 10/2010 |
| KR | 10-2014-0077811 | 6/2014 |

OTHER PUBLICATIONS

Korean Notice of Allowance dated Feb. 29, 2016 issued in Application No. 2016-015762891.
European Search Report dated Nov. 17, 2016 issued in Application No. 16155570.1.
Korean Office Action dated Nov. 30, 2015 issued in Application No. 10-2015-0022168.
European Search Report dated Jul. 29, 2016 issued in Application No. 16155570.1.

* cited by examiner

VACUUM CLEANER, BATTERY ASSEMBLY AND CHARGING STAND

CROSS-REFERENCE TO RELATED APPLICATION

This application claims priority under 35 U.S.C. §119 to Korean Patent Application No. 10-2015-0022168, filed in Korea on Feb. 13, 2015, whose entire disclosure is incorporated herein by reference.

BACKGROUND

1. Field

Embodiments relate to a vacuum cleaner, a battery assembly and a charging stand.

2. Background

A vacuum cleaner is an apparatus that suctions air and objects, such as, for example, dust, using a suction force generated by a suction motor installed inside a main body, and filters the dust from the air in the main body. The vacuum cleaner may be classified as a manual vacuum cleaner or an automatic vacuum cleaner. The manual vacuum cleaner is a vacuum cleaner that a user uses to directly perform a cleaning operation, and the automatic vacuum cleaner is a vacuum cleaner that performs the cleaning operation itself while traveling autonomously. The manual vacuum cleaner may be classified as a canister type cleaner, in which a suction nozzle is provided separately from a main body and connected with the main body through a connection tube, or an upright type cleaner, in which the suction nozzle is coupled to the main body.

Korean Patent Publication No. 10-2006-0118796 published on Nov. 24, 2006, which is incorporated herein by reference, discloses a power cord withdrawing port of a cleaner. A cord reel assembly is provided inside a main body, and the main body receives power by connecting a power cord to an electrical outlet. However, as the cleaner receives power through the cord reel assembly, the cleaner may move by only a length of the power cord wound on the cord reel assembly when a cleaning operation is performed, and the cleaning operation is restricted.

BRIEF DESCRIPTION OF THE DRAWINGS

Embodiments will be described in detail with reference to the following drawings in which like reference numerals refer to like elements, and wherein.

DETAILED DESCRIPTION

Figure 1:
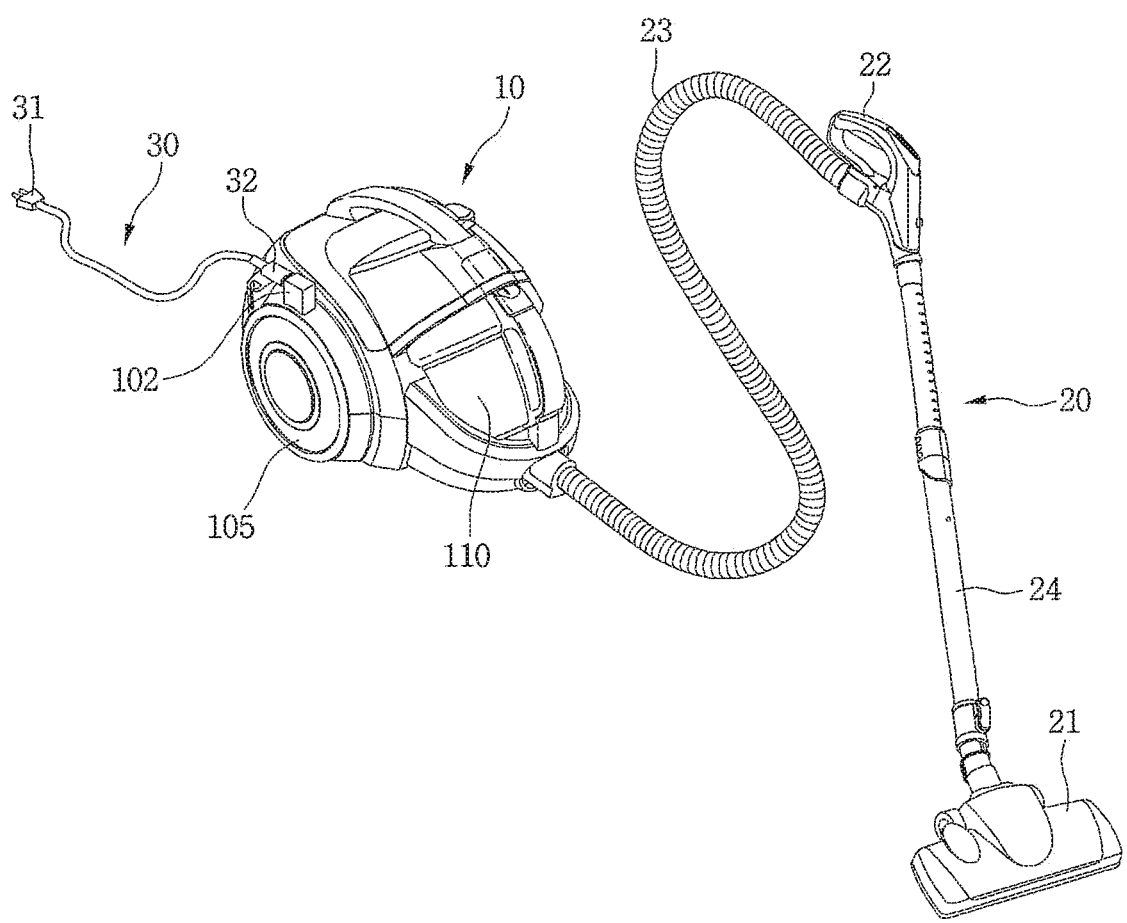
FIG. 1 is a perspective view of a vacuum cleaner according to a first embodiment.
Figure 2:
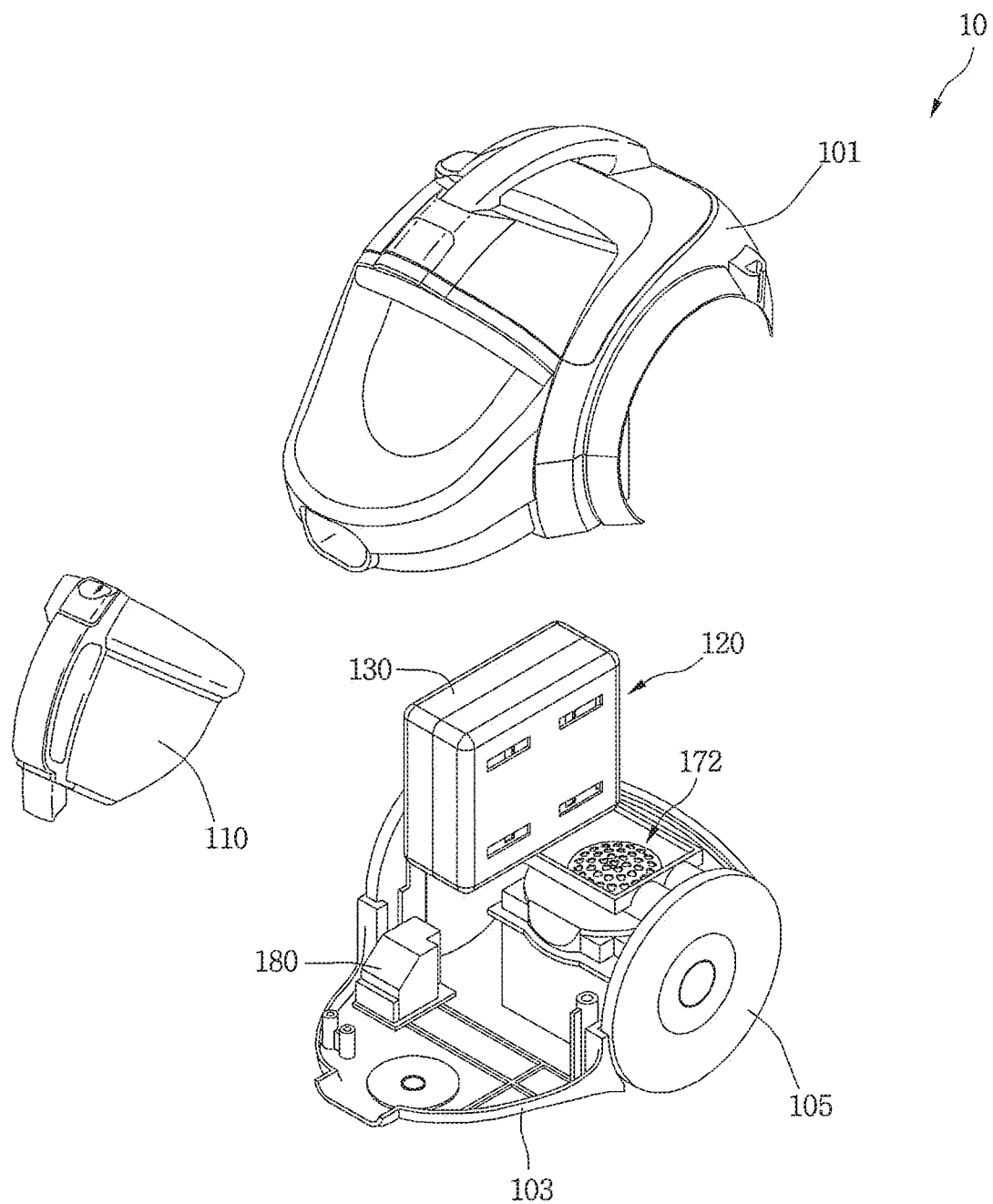
FIG. 2 is an exploded perspective view of a cleaner body of the vacuum cleaner according to the first embodiment.
Figure 3:
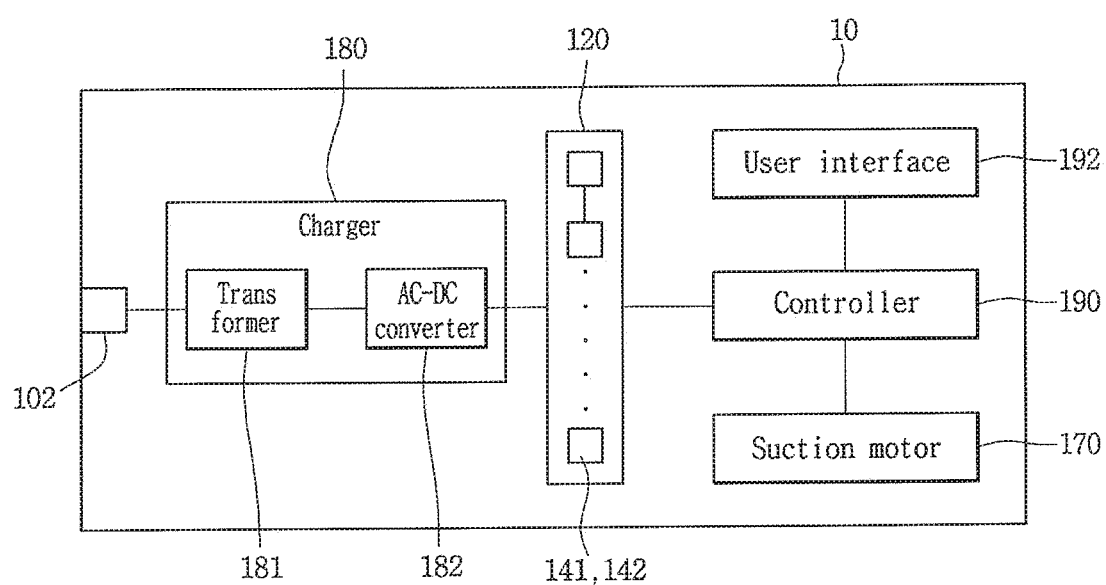
FIG. 3 is a schematic diagram of the vacuum cleaner according to the first embodiment.

FIG. 1 is a perspective view of a vacuum cleaner according to a first embodiment. FIG. 2 is an exploded perspective view of a cleaner body of the vacuum cleaner according to the first embodiment. FIG. 3 is a schematic diagram of the vacuum cleaner according to the first embodiment. Referring to FIGS. 1 to 3, a vacuum cleaner 1 may include a cleaner body 10 having a suction motor 170 for generating a suction force, and a suction unit or module 20 that guides air and objects such as dust to the cleaner body 10.

The suction unit 20 may include a suction part or head 21 that suctions the dust on a surface to be cleaned, for example, a floor surface, and connection parts or connectors 22, 23 and 24 that connect the suction part 21 to the cleaner body 10. The connection parts 22, 23 and 24 may include an extension tube 24, which may be connected to the suction part 21, a handle 22, which may be connected to the extension tube 24, and a suction hose 23, which may connect the handle 22 to the cleaner body 10.

The vacuum cleaner 1 may further include a separator, which may separate the air and the dust suctioned through the suction unit 20 from each other, and a container 110, which may store the dust separated in the separator. The container 110 may be separably installed or provided at the cleaner body 10. The separator may be manufactured separately from the container 110, or may form one module with the container 110.

The vacuum cleaner 1 may further include a battery assembly or a battery 120 that supplies power to the suction motor 170. The battery assembly 120 may be installed or provided at the cleaner body 10. The battery assembly 120 may also supply power to other elements or components in the vacuum cleaner other than the suction motor 170. Therefore, in the embodiments, a member or component, which may be operated by receiving power from the battery assembly 120, may be referred to as an energy consumption part or component.

The vacuum cleaner 1 may further include a charger 180 that charges up the battery assembly 120, and a charging connector 30, which may be separably connected to the cleaner body 10 and supply power to the cleaner body 10. The charging connector 30 may include a plug 31, which may be connected to an electrical outlet, and a first connector 32, which may be connected to the cleaner body 10.

The cleaner body 10 may include a second connector 102 to which the first connector 32 may be connected. The cleaner body 10 may include a first body 101, and a second body 103, which may be coupled to a lower side of the first body 101. A wheel 105 may be coupled to each of two sides of the second body 103.

The suction motor 170, the battery assembly 120, and the charger 180 may be installed at the second body 103. The suction motor 170 may be protected by a motor housing 172. The suction motor 170 may be accommodated in the motor housing 172.

For space efficiency, the battery assembly 120 may be located or provided at a lateral side of the suction motor 170.

For example, the suction motor 170 and the battery assembly 120 may be located between a plurality of wheels 105. The battery assembly 120 may be located between one of the plurality of wheels 105 and the suction motor 170. The charger 180 may be provided at a position which may be spaced apart from the battery assembly 120.

When the battery assembly 120 is provided between the wheel 105 and the suction motor 170, the battery assembly 120 may be spaced apart from the suction motor 170. A space for cooling may be formed between the battery assembly 120 and the suction motor 170. The battery assembly 120 may be located or provided in front of the suction motor 170 and may be spaced apart from the suction motor 170.

The second connector 102 may be provided at the suction part 21. Alternatively, the battery assembly 120 may be provided at the handle 22 or the suction part 21. The container 110 may be separably coupled to the first body 101, and the second connector 102 may be provided at the first body 101. The battery assembly 120 may include a plurality of battery cells 141 and 142. The plurality of battery cells 141 and 142 may be secondary battery cells, which may be chargeable and dischargeable.

The charger 180 may perform rectification and smoothing, and thus, may convert a received AC voltage into a DC voltage. The charger 180 may supply the converted DC voltage to the battery assembly 120. In other words, the charger 180 may convert the AC voltage into the DC voltage, and may supply the DC voltage to the battery assembly 120.

The charger 180 may include a transformer 181 that transforms an input AC voltage, and an AC-DC converter 182 that converts the AC voltage output from the transformer 181 into the DC voltage. The DC voltage output from the AC-DC converter 182 may also be transformed by the transformer, but the embodiment and a configuration of the charger 180 are not limited thereto. As the AC-DC converter may be a well-known configuration, detailed description thereof has been omitted. The suction motor 170 may be a brushless DC (BLDC) motor.

When the battery assembly 120 is charging, the charging connector 30 may be connected to the vacuum cleaner 1, and when a cleaning operation is performed using the vacuum cleaner 1, the charging connector 30 may be separated from the vacuum cleaner 1, and thus, the vacuum cleaner 1 may be able to move more freely. As the vacuum cleaner 1 receives the power from the battery assembly 120 without a power cord reel, a distance within which the vacuum cleaner 1 may move about may not be limited. Also, as the vacuum cleaner 1 may not move over a cord wound on the power cord reel and the cord may not need to be arranged while the vacuum cleaner 1 is moving, the vacuum cleaner 1 may move about smoothly.

The vacuum cleaner 1 may further include a controller 190 and a user interface 192. The user interface 192 may receive an operation command for the vacuum cleaner 1, and may also display operation information or state information of or about the vacuum cleaner 1. The controller 190 may control the energy consumption part based on an input operation command.

The user interface 192 may be provided at one or both of the handle 22 and the cleaner body 10. The user interface 192 may have a structure in which an input part or module and a display part or module may be integrally formed, but may also have a structure in which the input part and the display part may be separately formed.

A selection of inputs, for example, a power-on, a cleaning mode, a degree of an intensity of the suction force, in the vacuum cleaner 1 may be selected through the input part. The display part may display at least information of or about the battery assembly 120. When a residual battery value of the battery assembly 120 reaches a reference value, the controller 190 may enable the display part to display information notifying that charging of the battery assembly 120 is required.

The display part may indicate the residual battery value of the battery assembly 120 continuously or by stages. For example, the display part may indicate the residual battery value of the battery assembly 120 as a number or character or a graph. The display part may include a plurality of light emitting parts or devices, and may indicate the battery residual value of the battery assembly 120 by changing a number of light emitting parts that are turned on. The display part may indicate the residual battery value of the battery assembly 120 by changing a color of light emitted from the light emitting part.

Figure 4:
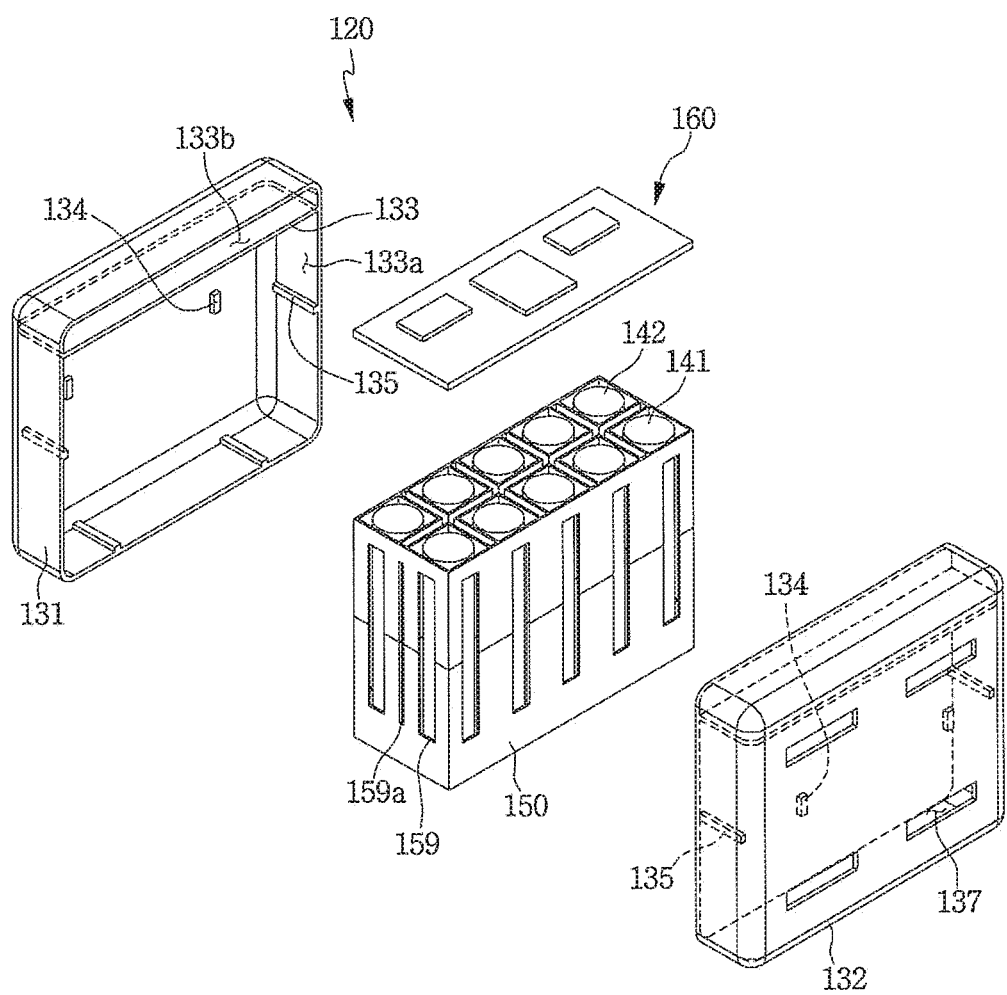
FIG. 4 is an exploded perspective view of a battery assembly according to the first embodiment.
Figure 5:
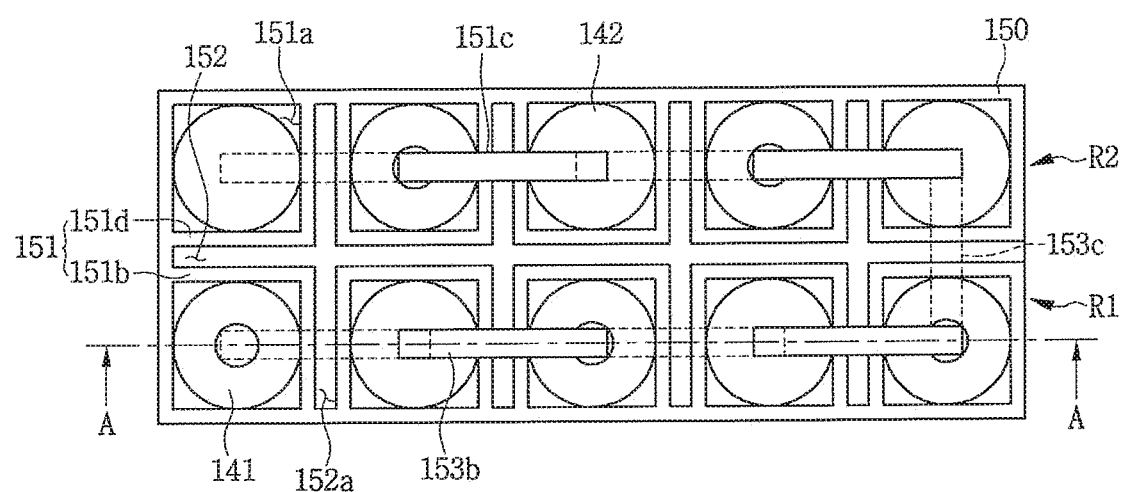
FIG. 5 is a plan view illustrating a battery cell accommodated in a battery cover.
Figure 6:
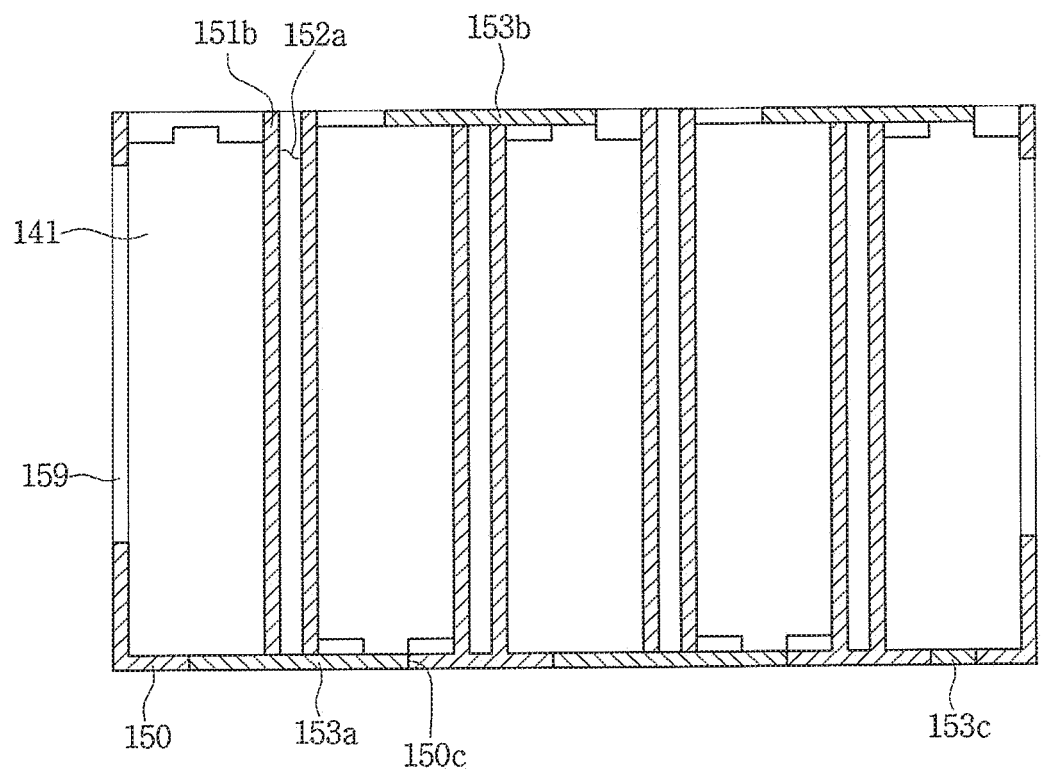
FIG. 6 is a cross-sectional view taken along line A-A of FIG. 5.

FIG. 4 is an exploded perspective view of the battery assembly according to the first embodiment. FIG. 5 is a plan view illustrating the battery cell accommodated in a battery cover. FIG. 6 is a cross-sectional view taken along line A-A of FIG. 5. Referring to FIGS. 2 and 4 to 6, the battery assembly 120 may include the plurality of battery cells 141 and 142, and a battery cover 150 that covers the plurality of battery cells 141 and 142.

The battery cover 150 may support the plurality of battery cells 141 and 142. The battery cover 150 may also accommodate the plurality of battery cells 141 and 142. The battery cover 150 may include a plurality of partition walls 151, which may form a plurality of cell chambers 151a to independently accommodate the plurality of battery cells 141 and 142. For example, each of the plurality of partition walls 151 may form the cell chamber 151a that includes a plurality of walls. FIG. 4 illustrates an embodiment in which four walls form one cell chamber 151a, however, the number of walls forming the cell chamber 151a and a shape of the cell chamber 151a is not limited thereto.

When the plurality of walls serve as one partition wall 151, and form the cell chamber 151a, two adjacent partition walls 151 may be connected to each other through a connection wall. The battery cover 150 may have one outer wall, and the plurality of partition walls 151 may divide a space formed by the outer wall into the plurality of cell chambers 151a. The plurality of partition walls 151 may be spaced apart from each other. The plurality of partition walls 151 may be provided at the battery cover 150 so that the plurality of battery cells 141 and 142 may be arranged in a plurality of rows. The plurality of battery cells 141 and 142 may be spaced apart from each other by the plurality of partition walls 151.

FIG. 5 illustrates the plurality of battery cells 141 and 142 arranged in two rows. In FIG. 5, R1 indicates the battery cells in a first row, and R2 indicates the battery cells in a second row. However, in the embodiment, an arrangement of the plurality of battery cells is not limited thereto. The plurality of battery cells 141 and 142 may include the battery cells 141 in the first row, and the battery cells 142 in the second row. One or more of the plurality of first partition walls 151b in the first row and one or more of the plurality of second partition walls 151d in the second row facing the first row may be spaced apart from each other. Thus, a first separation chamber 152 for air may be formed between the first partition walls 151b in the first row and the second partition walls 151d in the second row.

At least a part of the plurality of partition walls 151*b* and 151*d* that cover the battery cells in each row may be spaced apart from each other. A second separation chamber 152*a* for air may be located between the plurality of first partition walls 151*b* and between the plurality of second partition walls 151*d*. By such an arrangement of the first partition walls 151*b* and the second partition walls 151*d*, the battery cells 141 in the first row and the battery cells 142 in the second row may be prevented from being affected by heat generated from each of the battery cells 141 in the first row and the battery cells 142 in the second row. The battery cells in the same row may also be prevented from being affected by heat generated from each of the battery cells.

The battery cover 150 may further include a plurality of first heat radiation holes 159 that discharges the heat from the plurality of cell chambers 151*a* to an outside of the battery cover 150, and one or more second heat radiation holes 159*a* that discharges the heat of the first and second separation chambers 152 and 152*a*. The battery assembly 120 may further include a plurality of conductors 153*a*, 153*b* and 153*c*, which may connect the plurality of battery cells 141 and 142 in series. The plurality of conductors 153*a*, 153*b* and 153*c* may connect a positive pole of one battery cell with a negative pole of another battery cell. The plurality of conductors 153*a*, 153*b* and 153*c* may include a first conductor 153*a*, which may connect two battery cells in the same row at lower sides or ends of the two battery cells, and a second conductor 153*b*, which may connect two battery cells in the same row at upper sides or ends of the two battery cells.

For example, the first conductor 153*a* may be coupled to a lower side of the battery cover 150. In order for the first conductor 153*a* to be coupled to the lower side of the battery cover 150, a hole 150*c* may be formed at a lower side of the battery cover 150. The second conductor 153*b* may be coupled to two adjacent partition walls 151*b* and 151*d*. Therefore, the two partition walls 151*b* and 151*d* to which the second conductor 153*b* is coupled may include a coupling groove 151*c*.

Referring to FIGS. 5 and 6, among the plurality of battery cells in the first row, first and second battery cells from the left may be connected by the first conductor 153*a*, and second and third battery cells may be connected by the second conductor 153*b*. Also, third and fourth battery cells may be connected by the first conductor 153*a*.

The plurality of conductors 153*a*, 153*b* and 153*c* may further include a third conductor 153*c*, which may connect the battery cell 141 in the first row with the battery cell 142 in the second row. The third conductor 153*c* may be coupled to the battery cover 150 or the partition walls 151*b* and 151*d* according to an arrangement of the positive pole or the negative pole of each of the battery cells.

The battery cells in the first row may be connected in series, the last battery cell in the first row may be connected to the first battery cell in the second row in series, and the battery cells in the second row may be connected in series. In FIG. 5, among the battery cells in each row, two adjacent battery cells may be arranged so that a direction of a first pole, for example, the positive pole, of one cell may be opposite to a direction of a first pole, for example, the positive pole, of another cell. Also, a direction of a first pole, for example, the positive pole, of the battery cell in the first row may be opposite to a direction of a first pole, for example, the positive pole, of the battery cell in the second row.

The battery assembly 120 may further include a battery management unit or module (BMU) 160. The BMU 160 may manage the plurality of battery cells 141 and 142 to be maintained in or at a constant voltage. The BMU 160 manages the plurality of battery cells 141 and 142 to discharge at the constant voltage. The BMU 160 may include a protection circuit, which may protect the plurality of battery cells from overheating, an overvoltage of the battery cells, or an overcurrent of the battery cells. As the protection circuit may be well-known, description thereof has been omitted.

The BMU 160 may be electrically connected to each of the plurality of conductors 153*a*, 153*b* and 153*c*. The BMU 160 and the battery cover 150, in which the plurality of battery cells 141 and 142 may be accommodated, may be separately installed or provided at the cleaner body 10. The BMU 160 and the battery cover 150, in which the plurality of battery cells 141 and 142 may be accommodated, may be provided in the cleaner body 10 to be spaced apart from each other. The plurality of battery cells 141 and 142 and the battery cover 150 may hereinafter be referred to as a battery unit or module.

The battery assembly 120 may further include an outer case 130 that protects the battery cover 150 and the BMU 160. The outer case 130 may include a first case 131 and a second case 132, which may be coupled to the first case 131. The outer case 130 may further include a partition plate 133. The partition plate 133 may divide an internal space of the outer case 130 into a first space 133*a* and a second space 133*b*.

The first space 133*a* may accommodate the battery cover 150, and the second space 133*b* may accommodate the BMU 160. As the first space 133*a*, in which the battery cover 150 may be accommodated, is divided by the partition plate 133 from the second space 133*b*, in which the BMU 160 may be accommodated, the heat of the plurality of battery cells 141 and 142 transferred to the BMU 160 may be minimized.

The BMU 160 may be installed or provided at the partition plate 133, or may be installed or provided at the outer case 130, which may be spaced apart from the partition plate 133. The outer case 130 may further include a plurality of ribs 134 and 135, which may prevent movement of the battery cover 150 while the battery cover 150 is accommodated in the first space 133*a*. The plurality of ribs 134 and 135 may be provided at the battery cover 150. The battery cover 150 may be spaced apart from at least a part or portion of an inner surface of the outer case 130 by the plurality of ribs 134 and 135. For example, the battery cover 150 may be spaced apart from one or more of a bottom surface and a perimeter wall of the outer case 130. The battery cover 150 may be spaced apart from the partition plate 133.

When the battery cover 150 is spaced apart from one or more of the bottom surface and the perimeter wall of the outer case 130, a heat radiation path may be formed between the battery cover 150 and the outer case 130. The outer case 130 may further include one or more heat radiation holes 137. As the battery cover 150 is spaced apart from one or more of the bottom surface and the perimeter wall of the outer case 130, heat generated from the plurality of battery cells 141 and 142 conducted to the outer case 130 may be minimized, and the heat may be rapidly discharged through the heat radiation holes 137.

Even when a user grasps the outer case 130 of the battery assembly 120, for example, to replace or check the battery assembly 120 just after the vacuum cleaner 1 is used, or after the plurality of battery cells 141 and 142 discharges voltage, the user may be prevented from being hurt due to a high temperature of the battery assembly 120 and the vacuum cleaner 1. Due to the outer case 130, the battery cells 141 and 142 may be prevented from being damaged by an external shock.

Figure 7:
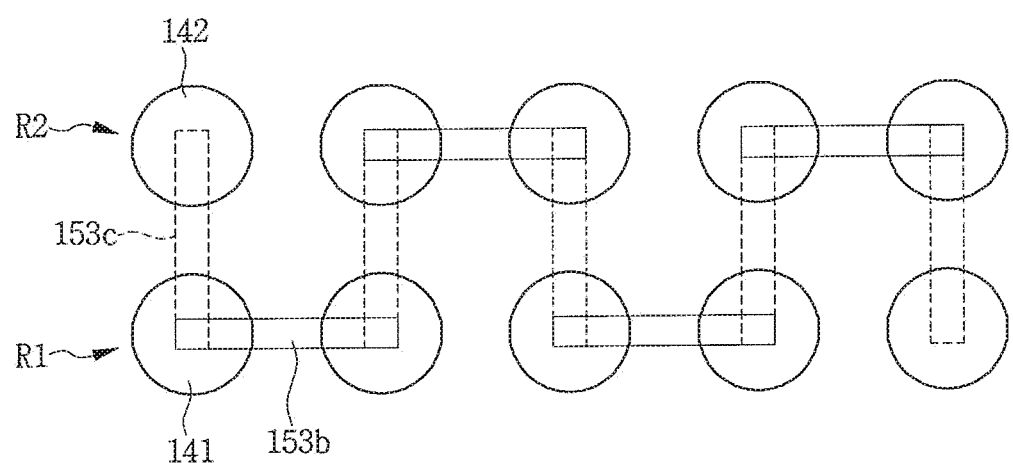
FIG. 7 is a view illustrating a connection method and an arrangement of a battery cell according to a second embodiment.

FIG. 7 is a view illustrating a connection method and an arrangement of the battery cell according to a second embodiment. The second embodiment is similar to the first embodiment, except for a connection method of the battery cell through the conductor. Hereinafter, only characteristic parts or components of the second embodiment that differ from the first embodiment may be described.

Referring to FIG. 7, the battery cells in the first row and the battery cells in the second row may be connected zigzag in series. For example, a first battery cell in the second row and a first battery cell in the first row may be connected by the third conductor 153c. The first battery cell in the first row, which may be a first battery cell from the left side among the battery cells in the first row, and a second battery cell in the first row may be connected by the second conductor 153b. The second battery cell in the first row and a second battery cell in the second row may be connected by the third conductor 153c. The second battery cell in the second row and a third battery cell in the second row may be connected by the second conductor 153b.

Figure 8:
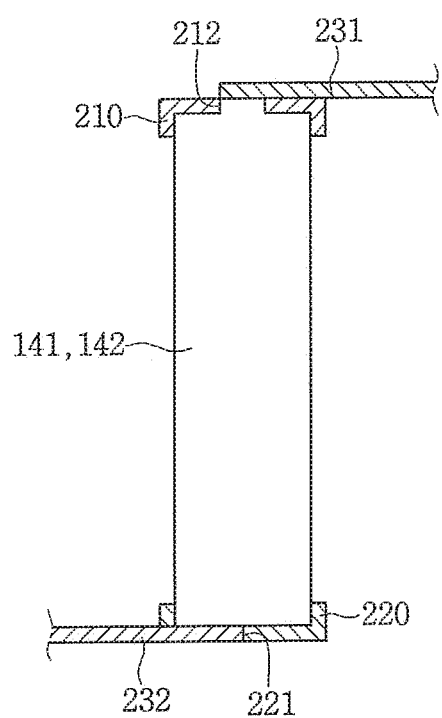
FIG. 8 is a view illustrating a cell cap that covers ends of a battery cell according to a third embodiment.

FIG. 8 is a view illustrating a cell cap that covers two ends of a battery cell according to a third embodiment. The third embodiment is similar to previous embodiments, except that the battery cell may be protected by a cell cap. Hereinafter, only characteristic parts or components of the third embodiment that differ from the previous embodiments may be described.

Referring to FIG. 8, a battery assembly may include cell caps 210 and 220, which may cover poles of each of the battery cells 141 and 142. The cell caps 210 and 220 may include a first cell cap 210 that covers the positive poles of the battery cells 141 and 142, and a second cell cap 220 that covers the negative poles of the battery cells 141 and 142. For example, the positive pole of one cell of the battery cells 141 and 142 may be connected to a first conductor 231, and the negative pole thereof may be connected to a second conductor 232. The first conductor 231 may be in contact with the positive pole passed through a hole 212 of the first cell cap 210. The first conductor 231 may cover the entire positive pole while being in contact with the positive pole, and thus, may prevent the positive pole from being exposed. The first conductor 231 connected to the positive pole of one battery cell may be connected to the negative pole of another battery cell.

The second conductor 232 may be inserted into an accommodation groove 221 of the second cell cap 220, and may be connected to the negative poles of the battery cells 141 and 142. The second conductor 232 may be fitted to the second cell cap 220, or may be integrally formed with the second cell cap 220 through insert injection molding. As both ends of the battery cells 141 and 142 are surrounded by the cell caps 210 and 220, objects such as, for example, foreign substances or moisture may be prevented from being introduced to both poles of the battery cells 141 and 142.

Figure 9:
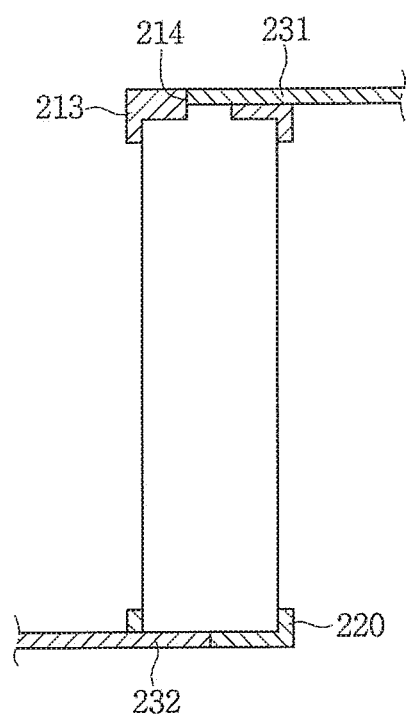
FIG. 9 is a view illustrating a cell cap that covers ends of a battery cell according to a fourth embodiment.

FIG. 9 is a view illustrating a cell cap that covers two ends of a battery cell according to a fourth embodiment. The fourth embodiment is similar to previous embodiments, except for a coupling structure between the first cell cap and the conductor. Hereinafter, only characteristic parts or components of the fourth embodiment that differ from the previous embodiments may be described.

Referring to FIG. 9, the first conductor 231 may be inserted into an accommodation groove 214 of a first cell cap 213 that covers the positive poles of the battery cells 141 and 142. The first conductor 231 may be connected to the positive poles of the battery cells 141 and 142 while being inserted into the accommodation groove 214. The first conductor 231 may be fitted to the first cell cap 213, or may be integrally formed with the first cell cap 213 through insert injection molding.

Figure 10:
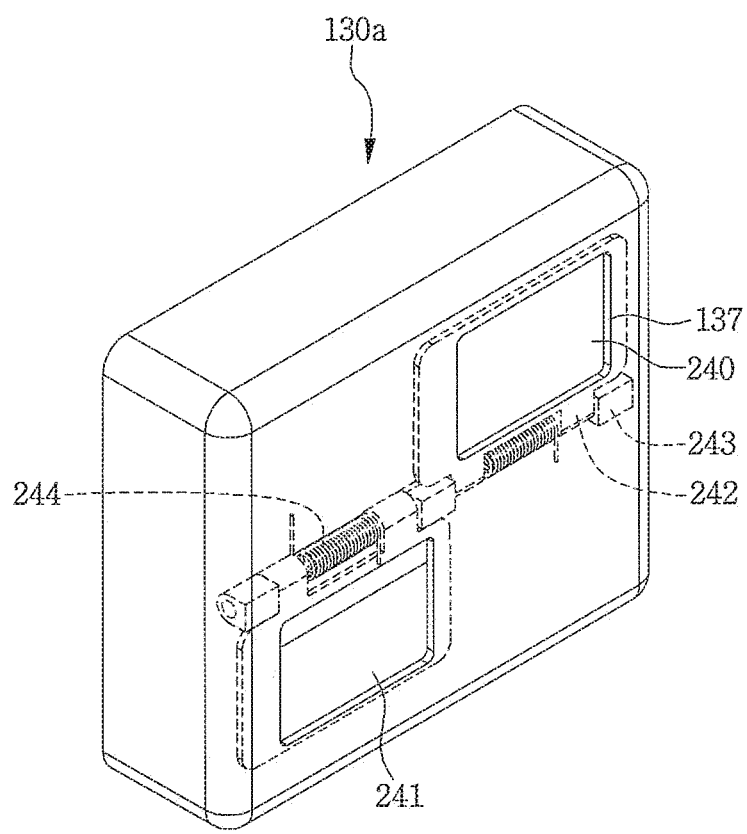
FIG. 10 is a view illustrating a portion of an outer case of a battery assembly according to a fifth embodiment.

FIG. 10 is a view illustrating a part or portion of an outer case of a battery assembly according to a fifth embodiment. The fifth embodiment is similar to previous embodiments, except for a structure of the outer case. Hereinafter, only characteristic parts or components of the fifth embodiment that differ from the previous embodiments may be described.

Referring to FIG. 10, an outer case 130a may include one or more heat radiation holes 137, and one or more opening and closing members or flaps 240 and 241 that open and close the one or more heat radiation holes 137. The one or more opening and closing members 240 and 241 may maintain a closed state of the one or more heat radiation holes 137, as long as an external force is not applied thereto from an outside.

The one or more opening and closing members 240 and 241 may open and close the one or more heat radiation holes 137 via a rotating motion. To rotate the one or more opening and closing members 240 and 241, the one or more opening and closing members 240 and 241 may include a hinge shaft 242, and the outer case 130a may include a shaft coupling part or coupler 243 to which the hinge shaft 242 is coupled.

The one or more opening and closing members 240 and 241 may be elastically supported by an elastic member or an elastic spring 244. For example, a force, by which the one or more opening and closing members 240 and 241 may be rotated in a direction that closes the one or more heat radiation holes 137, may be applied to the one or more opening and closing members 240 and 241 by the elastic member 244.

As the one or more opening and closing members 240 and 241 closes the one or more heat radiation holes 137 and so long as external force is not applied thereto, foreign substances may be prevented from being introduced into the outer case 130a through the one or more heat radiation holes 137 when the battery assembly 120 is transported before being installed or provided at the cleaner body 10 or when the battery assembly 120 is replaced. If the battery assembly 120 is installed or provided at the cleaner body 10, the one or more opening and closing members 240 and 241 may be operated by a pressing part or portion provided inside the cleaner body 10, and may open the one or more heat radiation holes 137.

Figure 11:
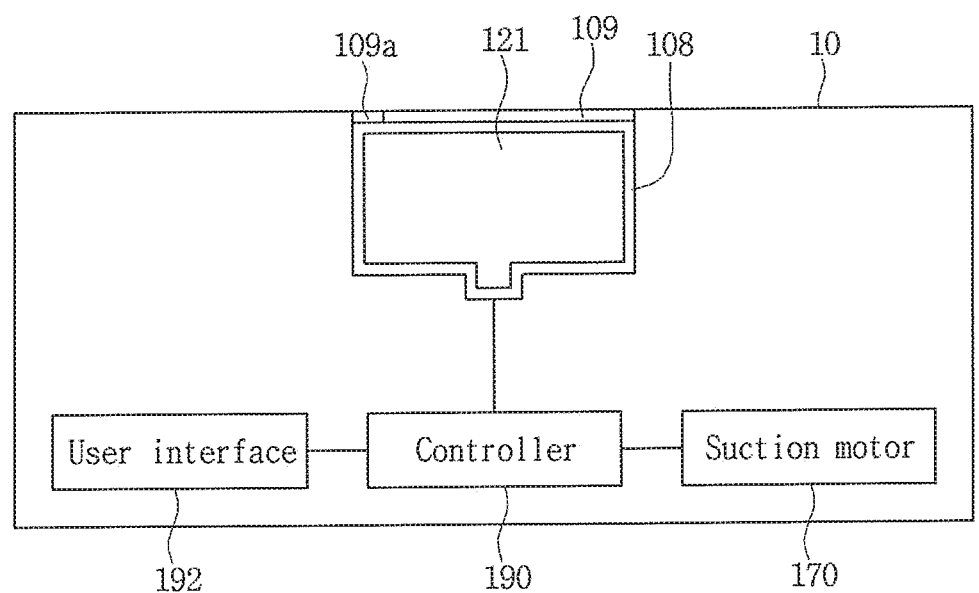
FIG. 11 is a schematic diagram of a vacuum cleaner according to a sixth embodiment.
Figure 12:
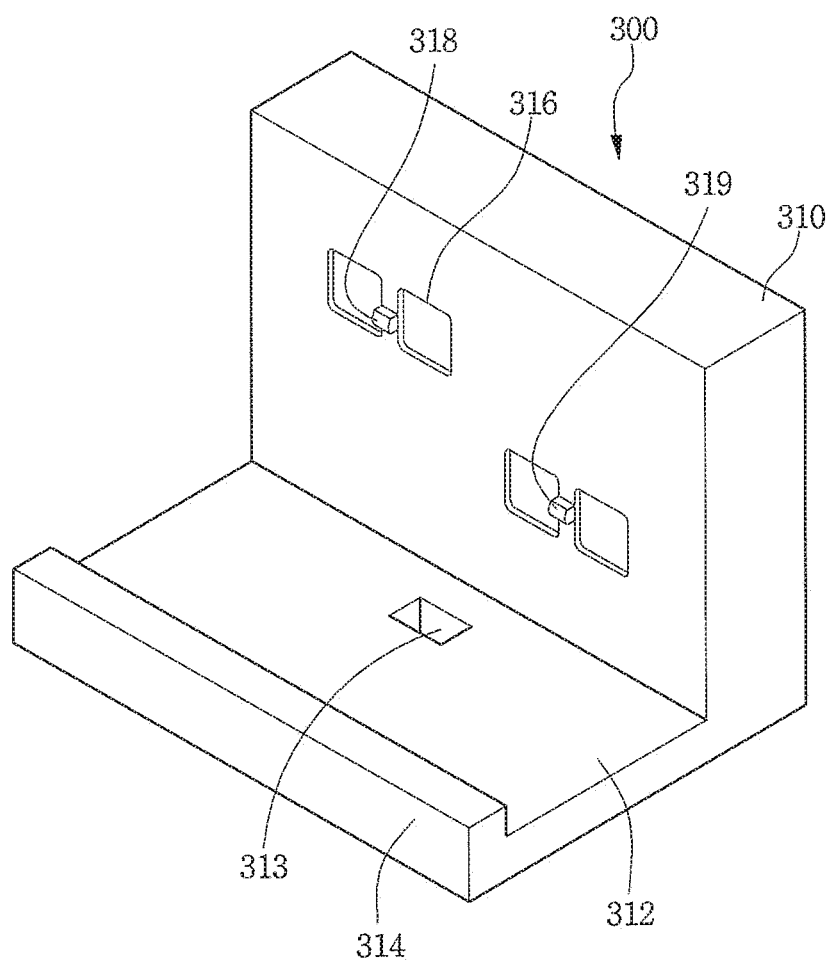
FIG. 12 is a view illustrating a charging stand for charging a battery assembly according to the sixth embodiment.
Figure 13:
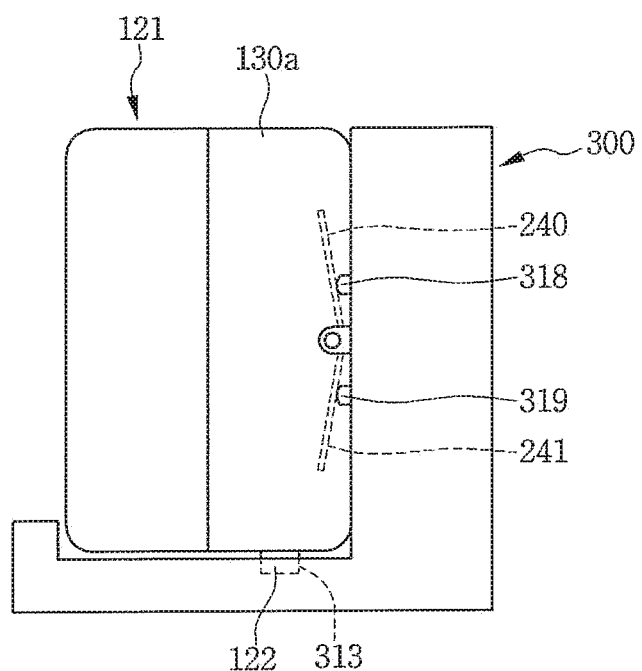
FIG. 13 is a view illustrating the battery assembly connected to the charging stand of FIG. 12.

FIG. 11 is a schematic diagram of a vacuum cleaner according to a sixth embodiment. FIG. 12 is a view illustrating a charging stand for charging a battery assembly according to the sixth embodiment. FIG. 13 is a view illustrating the battery assembly connected to the charging stand of FIG. 12. The sixth embodiment is similar to previous embodiments, except that the battery assembly may be separably coupled to the cleaner body, and may be charged by a charging stand. Hereinafter, only characteristic parts or components of the sixth embodiment that differ from the previous embodiments may be described.

Referring to FIG. 11, the cleaner body 10 of the embodiment may include a battery installation part or device 108, at which a battery assembly 121 may be separably installed or provided. The cleaner body 10 may further include the suction motor 170 and the user interface 192. The battery installation part 108 may be exposed to an outside of the cleaner body 10, or may be opened and closed by a cover 109. When the battery installation part 108 is opened and closed by the cover 109, the user may open the cover 109, and then may install the battery assembly 121 at the battery installation part 108 or may separate the battery assembly 121 from the battery installation part 108. The battery assembly 121 may be installed at or separated from the battery installation part 108 without disassembling of the cleaner body 10.

While the battery assembly 121 is installed at the battery installation part 108, at least a part or portion of an outer case of the battery assembly 121 may be spaced apart from the battery installation part 108. A space between the battery installation part 108 and the battery assembly 121 may serve as a heat radiation path. When the cover 109 covers the battery installation part 108, the cover 109 may include one or more heat radiation holes 109a.

When the battery assembly 121 is separably installed or provided at the cleaner body 10, the battery assembly 121 may be connected to a charging stand 300 to be charged while separated from the cleaner body 10. Thus, the charger 180 provided at the cleaner body 10 may be omitted. Alternatively, even though the battery assembly 121 may be charged by the charging stand 300, the charger 180 may also be provided at the cleaner body 10. Thus, the battery assembly 121 may be charged while not separated from the cleaner body 10. The battery assembly 121 may be charged while installed or provided at the cleaner body 10, and may also be charged by the charging stand 300 while separated from the cleaner body 10.

The outer case 130a of the battery assembly 121 may include the one or more opening and closing members 240 and 241 illustrated in FIG. 10. The one or more opening and closing members 240 and 241 may be operated by a pressing part or portion provided at the battery installation part 108 while installed at the battery installation part 108.

The charging stand 300 may include a charging stand body 310. The charging stand body 310 may include a supporting part or support 312 that supports the battery assembly 120. The supporting part 312 may include a movement preventing part or preventer 314 that prevents movement of the battery assembly 121. The supporting part 312 may further include a terminal connection part or connector 313, which may be connected to a terminal 122 of the battery assembly 121.

The supporting part 312 may be omitted from the charging stand body 310. Each of the charging stand body 310 and the battery assembly 121 may be put on a supporting surface, for example, a floor surface. The charging stand body 310 may include the movement preventing part 314 that prevents the movement of the battery assembly 121 and the terminal connection part 313.

The charging stand body 310 may include pressing parts or portions 318 and 319 that operate the one or more opening and closing members 240 and 241 of the battery assembly 121. The charging stand body 310 may include one or more heat radiation openings 316, which may communicate with one or more heat radiation holes opened by the one or more opening and closing members 240 and 241. While the battery assembly 121 is charging, heat discharged from the battery assembly 121 may be introduced into the charging stand 300, and then may be discharged to an outside of the charging stand 300. Thus, heat radiation may be smoothly performed while the battery assembly 121 is charging.

Embodiments in which the cleaner may be a canister type cleaner have been described. However, the embodiments may also be applied to an upright type cleaner. In the upright type cleaner, the battery that supplies power to the suction motor may be provided at the suction part or portion or the cleaner body. The above-described charger may also be provided at the suction part or the cleaner body, and the charging connector may be connected to the suction part or the cleaner body.

Embodiments disclosed herein provide a vacuum cleaner which may be easily moved. Embodiments disclosed herein also provide a vacuum cleaner in which heat emission performance of a battery assembly for supplying electric power may be enhanced, and a reduction in a life span of the battery and the battery assembly may be prevented. Embodiments disclosed herein also provide a charging stand which may charge a battery assembly.

According to embodiments disclosed herein, a battery assembly may include a plurality of battery cells, and a battery cover configured to support the plurality of battery cells. The battery cover may include a plurality of partition walls, and each of the plurality of partition walls may form a plurality of cell chambers that accommodate each of the plurality of battery cells, respectively, and at least a portion of the plurality of partition walls may be spaced apart from each other to form at least one separation chamber.

According to embodiments disclosed herein, a vacuum cleaner may include a cleaner body having an energy consumption part or component operated by receiving power, and a battery installation part or module, a suction part or portion configured to communicate with the cleaner body and to suction air and dust, and a battery assembly configured to supply the power to the energy consumption part, and separably installed or provided at the battery installation part. The battery assembly may include a plurality of battery cells, and a battery cover configured to support the plurality of battery cells. The battery cover may include a plurality of partition walls that forms a plurality of cell chambers that accommodates each of the plurality of battery cells, respectively.

According to embodiments disclosed herein, a charging stand may include a charging stand body having a terminal connected with or to a terminal of a battery assembly; a pressing part provided at the charging stand body and configured to press an opening and closing member or flap to open and close a heat radiation hole of the battery assembly, and a heat radiation opening provided at the charging stand body and configured to communicate with the heat radiation hole of the battery assembly.

In the description of embodiments, terms such as first, second, A, B, (a), (b) or the like may be used when describing components of the embodiments. Each of these terminologies is not used to define an essence, order or sequence of a corresponding component but used merely to distinguish the corresponding component from other component(s). If it is described in the specification that one component is "connected," "coupled" or "joined" to another component, the former may be directly "connected," "coupled," and "joined" to the latter or "connected", "coupled", and "joined" to the latter via another component.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A battery assembly, comprising:
a plurality of battery cells; and
a battery cover configured to support the plurality of battery cells,
wherein the battery cover includes a plurality of partition walls, and each of the plurality of partition walls forms a plurality of cell chambers that accommodate each of the plurality of battery cells, respectively, and at least a portion of the plurality of partition walls are spaced apart from each other to form at least one separation chamber,
wherein the plurality of partition walls is configured to allow the plurality of battery cells to be arranged in a plurality of rows,
wherein the plurality of partition walls includes a plurality of first partition walls that accommodates the plurality of battery cells in a first row, and a plurality of second partition walls that accommodates the plurality of battery cells in a second row,
wherein one or more of the plurality of first partition walls are spaced apart from one or more of the plurality of second partition walls to form a first separation chamber between the plurality of first partition walls and the plurality of second partition walls,
wherein a first partition wall of the plurality of first partition walls of a first one of the battery cells in the first row is spaced apart from a second partition wall of the plurality of first partition walls of a second one of the battery cells in the first row to form a second separation chamber between the first one of the battery cells in the first row and the second one of the battery cells in the first row, and
wherein the battery cover includes:
a plurality of first heat radiation holes that discharges heat out of the battery cover from each of the plurality of cell chambers, each of the plurality of first heat radiation holes provided around a periphery of the battery cover and extending in a length-wise direction along each of the plurality of battery cells, and
at least a first one or more second heat radiation holes that discharges heat out of the battery cover from the first separation chamber and at least a second one or more second heat radiation holes that discharges heat out of the battery cover from the second separation chamber, the first and second one or more second heat radiation holes provided around the periphery of the battery cover and extending in the length-wise direction.

2. The battery assembly according to claim 1, wherein at least one of at least a portion of each of the plurality of first partition walls is spaced apart from each other to form the second separation chamber, or at least a portion of each of the plurality of second partition walls is spaced apart from each other to form the second separation chamber, or at least a portion of each of the plurality of first partition walls and at least a portion of each of the plurality of second partition walls are spaced apart from each other to form the second separation chamber.

3. The battery assembly according to claim 2, wherein a portion of the second separation chamber intersects a portion of the first separation chamber.

4. The battery assembly according to claim 1, wherein the plurality of battery cells in one of the plurality of rows are arranged so that a direction of a first pole of a first battery cell is opposite to a direction of a first pole of a second battery cell.

5. The battery assembly according to claim 1, wherein a direction of a first pole of a first battery cell in the first row among the plurality of rows is opposite to a direction of a first pole of a second battery cell in the second row facing the first battery cell in the first row.

6. The battery assembly according to claim 1, further comprising a first conductor that electrically connects the plurality of battery cells arranged in a same row among the plurality of rows, and a second conductor that electrically connects two battery cells in two adjacent rows among the plurality of rows.

7. The battery assembly according to claim 6, wherein at least one of the first conductor or the second conductor is coupled to at least one partition wall of the plurality of partition walls.

8. The battery assembly according to claim 1, further comprising a conductor that connects the plurality of battery cells, and a cell cap that covers one or more of both poles of each of the plurality of battery cells, wherein the conductor contacts one pole of each of the plurality of battery cells passed through the cell cap.

9. The battery assembly according to claim 1, further comprising a conductor that connects the plurality of battery cells, and a cell cap that covers one or more of both poles of each of the plurality of battery cells, wherein the conductor contacts one pole of each of the plurality of battery cells while being inserted into the cell cap.

10. The battery assembly according to claim 1, further comprising a battery management unit that manages a voltage of each of the plurality of battery cells, and an outer case that accommodates the battery management unit and the battery cover.

11. The battery assembly according to claim 10, wherein the outer case includes a partition plate that divides a first space that accommodates the battery cover from a second space that accommodates the battery management unit.

12. The battery assembly according to claim 10, wherein at least a portion of an internal surface of the outer case and the battery cover are spaced apart from each other to form a heat radiation path between the internal surface of the outer case and the battery cover.

13. The battery assembly according to claim 10, wherein the outer case includes a heat radiation hole that discharges internal heat from the outer case to outside the outer case.

14. The battery assembly according to claim 13, wherein the outer case further includes an opening and closing flap that opens and closes the heat radiation hole, and an elastic member that provides an elastic force to the opening and closing flap in a direction that the opening and closing flap closes the heat radiation hole.

* * * * *